(12) United States Patent
Rypinski et al.

(10) Patent No.: US 6,647,339 B2
(45) Date of Patent: Nov. 11, 2003

(54) SHARED REFERENCE STATION

(75) Inventors: Christopher S. Rypinski, San Francisco, CA (US); Martin Junkar, San Mateo, CA (US)

(73) Assignees: Seiko Epson Corporation, Tokyo (JP); eRide, Inc., San Francisco, CA (US)

( * ) Notice: Subject to any disclaimer, the term of this patent is extended or adjusted under 35 U.S.C. 154(b) by 0 days.

(21) Appl. No.: 10/079,252

(22) Filed: Feb. 19, 2002

(65) Prior Publication Data

US 2003/0158663 A1 Aug. 21, 2003

(51) Int. Cl.[7] .............................................. G01C 21/28
(52) U.S. Cl. .................. 701/213; 701/215; 342/357.06; 342/357.09; 342/357.13
(58) Field of Search ................................. 701/213, 215; 342/357.06, 357.09, 357.12, 357.13

(56) References Cited

U.S. PATENT DOCUMENTS 6,437,734 B1 * 8/2002 McBurney et al. ..... 342/357.09
6,473,030 B1 * 10/2002 McBurney et al. ..... 342/357.03

* cited by examiner

*Primary Examiner*—Gertrude Arthur

(57) ABSTRACT

A reference station system comprises a plurality of GPS reference stations that are distributed in different parts of the world to be able to simultaneously gather a complete set of satellite vehicle ephemeredes. Each reference station is associated with a network server connected to the Internet. Each network server posts ephemeredes, NAV-data, and other useful information for clients derived from its corresponding reference station. All such network servers inject their information in all the other servers in the system Each server validates and authenticates any injected data. Each client is also qualified as a subscriber before being able to access the complete ephemeredes database and other GPS system information.

10 Claims, 1 Drawing Sheet

SHARED REFERENCE STATION

FIELD OF THE INVENTION

Figure 1:
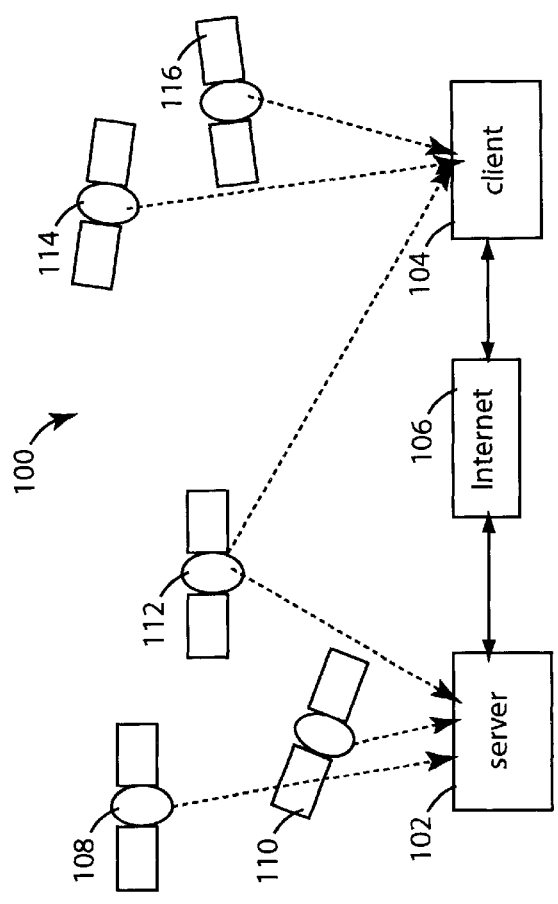

The present invention relates to navigation satellite receivers, and more particularly to methods and systems for worldwide sharing of GPS reference stations over a network server.

DESCRIPTION OF THE PRIOR ART

Global positioning system (GPS) receivers use signals received from several earth-orbiting satellites in a constellation to determine user position and velocity, and other navigational data. A navigation receiver that has just been turned on does not yet know where it is, how much its crystal oscillator is in error, nor what time it is. All these are needed to find and lock onto the satellite transmissions, and so a search must be made of all the possibilities.

Each GPS satellite vehicle (SV) transmits navigation (NAV) data at fifty bits-per-second, and includes ephemeris, clock and almanac information. Such information allows a GPS receiver to compute its position, velocity, and time. One whole data frame of NAV data is 1500-bits long, and thus takes thirty seconds to transmit.

SUMMARY OF THE INVENTION

It is therefore an object of the present invention to provide a method and system for gathering and sharing information that can assist navigation satellite reception and receiver initialization.

It is another object of the present invention to provide a method and system for reducing the cost and duplication of GPS reference stations and servers distributed throughout the world.

It is a further object of the present invention to provide a satellite-navigation system that is cost effective.

Briefly, a reference station system embodiment of the present invention comprises-a plurality of GPS reference stations that are distributed in different parts of the world to be able to simultaneously gather a complete set of satellite vehicle ephemeredes. Each reference station is associated with a network server connected to the Internet. Each network server posts ephemeredes, NAV-data, and other useful information for clients derived from its corresponding reference station. All such network servers inject their information in all the other servers in the system Each server validates and authenticates any injected data. Each client is also qualified as a subscriber before being able to access the complete ephemeredes database and other GPS system information.

An advantage of the present invention is that a system and method are provided that allows single clients to subscribe to one reference station server no matter where they travel.

Another advantage of the present invention is that a system and method are provided for making simple and cost effective navigation satellite reference stations and servers.

These and other objects and advantages of the present invention will no doubt become obvious to those of ordinary skill in the art after having read the following detailed description of the preferred embodiments which are illustrated in the various drawing figures.

IN THE DRAWINGS

Figure 2:
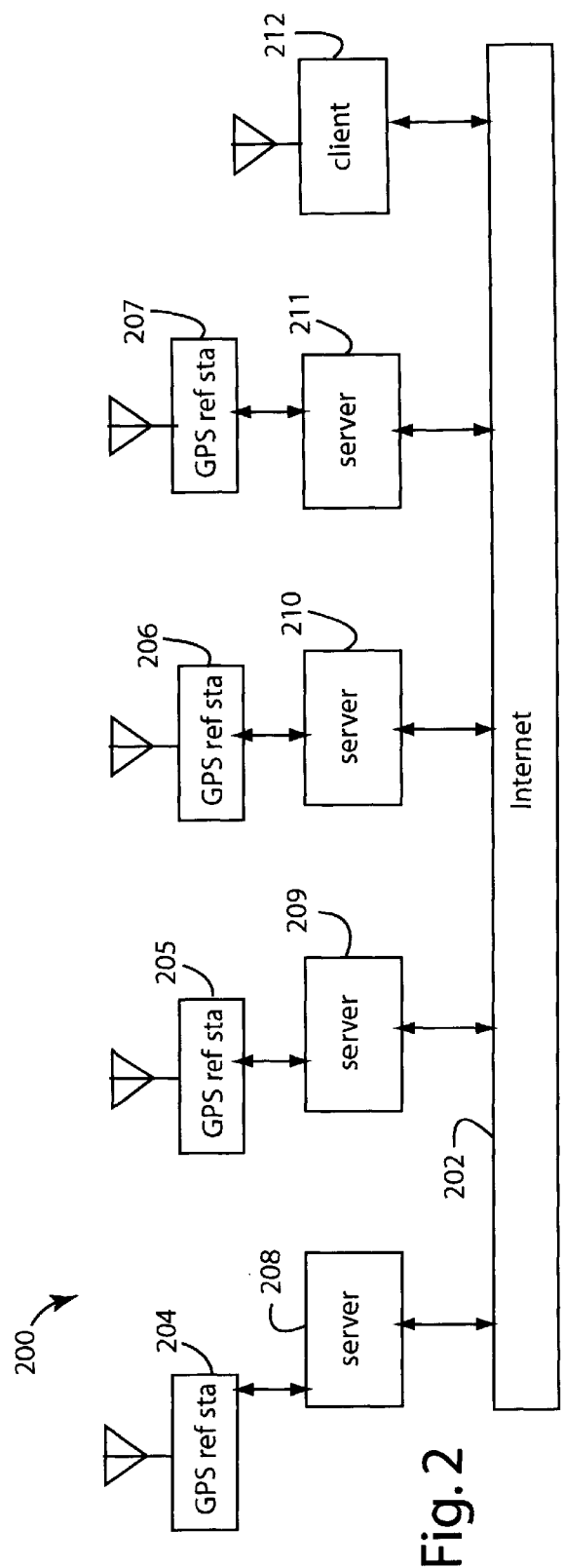

FIG. 1 is a functional block diagram of a network system embodiment of the present invention wherein a server is assisting a client with time information communicated over the Internet; and FIG. 2 is a functional block diagram of a reference station system embodiment of the present invention.

DETAILED DESCRIPTION OF THE PREFERRED EMBODIMENT

FIG. 1 illustrates a network system 100, in an embodiment of the present invention, that includes a reference-station server system 102, a user client system 104, and an intervening computer network 106 such as the Internet. The server system 102 includes a navigation satellite receiver that has locked onto and is tracking a constellation of navigation satellites 108, 110, and 112. Some of these may also be visible to the client system 104. Another constellation of navigation satellites, including 114 and 116 is visible to client system 104. The client system 104 includes its own navigation satellite receiver, but such may not have yet locked onto and be tracking its constellation of navigation satellites 112, 114, and 116.

The server system 102 is intended to be always on and tracking its constellation of navigation satellites 108, 110, and 112. It is then able to discern accurate, absolute system time and may also provide current ephemeris, troposphere, ionosphere, and other information to other, not-yet-initialized navigation satellite receivers. Such information all needs to be determined during initialization, and spoon feeding any of it from another source will dramatically improve time-to-first-fix.

In particular, the server system 102 stores the 12.5 minute repeating NAV data message. It forwards parts of this on request to the client system 104. Such allows the client system 104 to do pattern matching of NAV data it receives with the stored-and-forwarded NAV data. The client system 104 can thereby synchronize to the NAV data frames even before receiving its first preamble in its first TLM word.

The client system 104 will typically have its own 24-bit millisecond clock (Msec24) that starts at zero when the power is turned on. Each epoch of the C/A-code is one millisecond. The server system 102 will know GPS time, and have the Z-count. The Z-count is a 29-bit binary number that represents a fundamental GPS time unit. The ten most significant bits carry the GPS week number, and the nineteen least significant bits give the time of week (TOW) count in units of 1.5 seconds. A much finer gauge of the system time is available once the receiver locks onto a few GPS satellites. Prior art devices have depended on determining the Z-count during initialization.

What specifically needs to be determined during the initialization of client system 104 is how much of an offset needs to be added to Msec24 to equal GPS time. This will dictate the correct NAV data frame synchronization. The time required to achieve such synchronization will be dramatically reduced in the client system 104 if a subframe that has just been received is used as a template to search the sequential record of subframes the server system 102 has observed.

FIG. 2 represents a shared reference station system embodiment of the present invention, and is referred to herein by the general reference numeral 200. The system 200 communicates over the Internet 202. A number of GPS reference stations 204–207 are situated at various point around the world. Preferably, there are a sufficient number of GPS reference stations 204–207 at strategic points to guarantee that all operational GPS satellite vehicles are being tracked at any instant. A number of network servers 208–211 are associated with the GPS reference stations 204–207 and help distribute ephemeris and NAV-data information learned to a client 212. There can be thousands of such clients simultaneously connected and being serviced by one or more of the network servers 208–211.

The ephemeredes from all the operational satellite vehicles in the GPS system are collected into a shared database. Copies of this shared database are mirrored in all the network servers 208–211. This complete-collection is thereafter available to the client 212 from any server. The advantage to the client 212 is that if it's operating in high sensitivity mode, e.g., indoors, the ephemeredes will be indispensable in initialization and the finding of a first or subsequent position fix.

A typical network server 208–211 will have a reference station data server (RSDS) module and a reference station data injector (RSDI) module. The amount of data being transferred around the system 200 is minimized by processing and validating the data with a reference station manager (RSM). For example, it is not necessary to time packets. Data from any unhealthy GPS reference station 204–207 is also not propagated.

The RSDS reads data from a host system, e.g., by subscribing to Java messaging service (JMS) messages published by a local RSM. It accepts requests from RSDI's that want to subscribe to RS data. The RSDS authenticates and validates the requesting RSDI's. It accepts and sets the range and amount of RS data that can be sent to each subscribing RSDI. The RSDI can specify reference stations by their geographic region or by name/ID. If the RSDS verifies that the RSDI is authorized to use that data, the data is sent.

The RSDI subscribes to the RS data with RSDS servers that it is configured for. It publishes the data on local JMS on the same topics as RSM. The RS data received from other systems should not be used by RSDS, since this would cause a loop effect. Therefore, the RSDS could be built into a part of the RSM, e.g., running as a thread. Otherwise, the data could be a different set of topics. The RSDS and RSDI could also run in the same process, where RSDS checks which data was received by RSDI and not propagate it to other RSDI nodes.

The RSDS preferably uses originator-identity information included in the JMS messages to filter out data and prevent looping.

The RSDS and RSDI can exchange data by socket or SSL connections. Messages are sent as Java objects using serialization. JMS messaging across different implementations is not easy. Many incompatibilities exist in different suppliers' products.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the "true" spirit and scope of the invention.

What is claimed is:

1. A shared reference-station system, comprising:
    a plurality of GPS reference stations that are distributed in different parts of the world to be able to simultaneously gather part-by-part a complete set of satellite vehicle ephemeredes;
    a plurality of network servers each for connecting to the Internet and each proximately associated with respective ones of the plurality of GPS reference stations;
    a shared database of ephemeredes for receiving ephemerede contributions from each GPS reference station and network server pair and for mirroring a complete collection of all such satellite vehicle ephemeredes into each of the plurality of network servers;
    wherein, a client connected to the Internet can access the shared database to assist in its own initialization.

2. The system of claim 1, wherein:
    each of the ones of the plurality of network servers inject their information in all the other network servers in the system.

3. The system of claim 1, wherein:
    each of the ones of the plurality of network servers validates and authenticates any injected data.

4. The system of claim 1, wherein:
    each one of the plurality of network servers qualifies and validates a client as a subscriber before sharing access to a complete ephemeredes database and other GPS system information.

5. The system of claim 1, wherein:
    the shared database further receives, accumulates, and mirrors NAV-data information that can assist the client in pattern matching of NAV-data messages received by the client that are weak and that are used to initialize.

6. A method of providing acquisition and fix information to GPS receivers connected to networks as clients, the method comprising the steps of:
    distributing a plurality of GPS reference stations in different parts of the world to be able to simultaneously gather a complete set of satellite vehicle ephemeredes;
    connecting a plurality of network servers to the Internet and proximately associating them with ones of the plurality of GPS reference stations;
    receiving into a shared database of ephemeredes any ephemerede contributions from each GPS reference station and network server pair;
    mirroring a collection of NAV-data into each of said plurality of network servers;
    wherein, a client connected to the Internet can access the shared database to assist in its own initialization.

7. The method of claim 6, further comprising the step of:
    using each one of the plurality of network servers to inject their information in all the other network servers in the system.

8. The method of claim 6, further comprising the step of:
    validating and authenticating any injected data at each of the ones of the plurality of network servers.

9. The method of claim 6, further comprising the step of:
    qualifying and validating a client, at each one of the plurality of network servers, as a subscriber before sharing access to a complete ephemeredes database and other GPS system information.

10. The method of claim 6, wherein:
    the steps of receiving and mirroring are such that said shared database further receives, accumulates, and mirrors NAV-data information that can assist the client in pattern matching of NAV-data messages received by the client that are weak and that are used to initialize.

* * * * *